J. HENDY.
Gold and Silver Washing Apparatus.
No. 52,850. Patented Feb. 27, 1866.
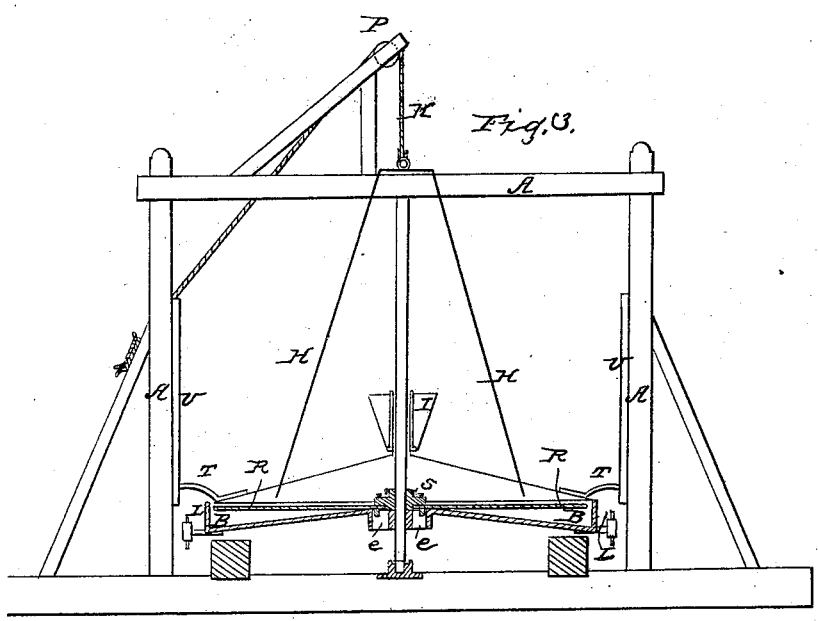
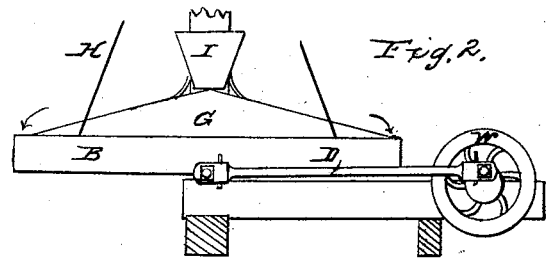
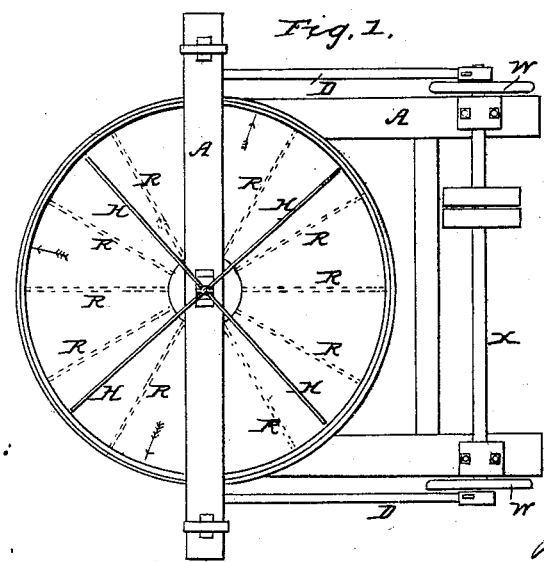
Witnesses:
Chs. N. Bond
W. P. Lawton
Inventor:
Joshua Hendy

UNITED STATES PATENT OFFICE.

JOSHUA HENDY, OF SAN FRANCISCO, CALIFORNIA.

IMPROVEMENT IN GOLD AND SILVER WASHING APPARATUS.

Specification forming part of Letters Patent No. 52,850, dated February 27, 1866.

*To all whom it may concern:*

Be it known that I, JOSHUA HENDY, of the city and county of San Francisco, in the State of California, have invented new and useful Improvements in Machines for Washing and Concentrating Sulphurets and Tailings of Gold, Silver, Copper, Tin, and other Metals; and I do hereby declare that the following is an exact and full description thereof, reference being had to the accompanying drawings and the letters of reference marked thereon.

Figure 1 represents the machine viewed from above. Fig. 2 is a side view with a portion of the frame removed. Fig. 3 is a vertical section.

A is a frame of wood. B is a pan similar to a common amalgamating-pan, having a convex bottom with central openings, e e, as shown in Fig. 3. E is an upright shaft, to which pan B is keyed. D D are driving-rods attached to crank-pins on fly-wheels W W. S is a hub keyed to shaft E, provided with bars R R, radiating in the manner of spokes. G is an apron or distributer, with a collar working loosely round the shaft E, and is suspended in place by rods H H and cord K, passing over pulley P. T T are guide-fingers attached to distributer G and working in slides U U upon frame A.

Operation: The pan is oscillated by means of shaft X and rods D D. The crushed ore, sulphurets, or other matter, mixed with water, passes through the hopper I upon distributer G and is distributed over its outer edge into pan B at its inner circumference. The sulphurets or other matter to be washed are much agitated near the circumference of the pan, while at the center very little motion is caused, so that the sulphurets, amalgam, and metallic substances, being the heavier portion of the contents of the pan, will remain near the circumference, while the earthy portions will pass off through the openings in the center. The riffles formed of the bars R R are coated with mercury and oscillate with the pan at the surface of the water and collect the mercury and amalgam that have been ground to so fine a powder that they would otherwise pass out at the center of the pan. The apron G can be raised or lowered by means of the cord K whenever it is desired, and is always kept in proper position by means of the guide-fingers T T and slides U U.

What I claim as my invention, and for which I desire Letters Patent to issue, is—

1. The guide-fingers T T, attached to distributer G, working in slides U U or their equivalent.

2. The riffle-bars R R, coated with mercury, for the purpose as herein set forth.

3. The riffle-bars R R, guide-fingers T T, and slides U U, in combination with distributer G and pan B, with convex bottom and central outlets, e e, substantially as described, and for the uses and purposes as hereinbefore set forth.

JOSHUA HENDY.

Witnesses:
CHAS. R. BOND,
W. W. LAWTON.